(12) United States Patent
Kim et al.

(10) Patent No.: US 10,185,180 B2
(45) Date of Patent: Jan. 22, 2019

(54) LIQUID CRYSTAL DISPLAY DEVICE PROVIDED WITH A REFLECTIVE-TYPE MONOCHROMATIC DISPLAY SCREEN IN ADDITION TO A COLOR DISPLAY SCREEN

(71) Applicant: SAMSUNG DISPLAY CO., LTD., Yongin, Gyeonggi-Do (KR)

(72) Inventors: Hoon Kim, Ansan-si (KR); Kichul Shin, Seongnam-si (KR); Minju Han, Seoul (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 14/960,929

(22) Filed: Dec. 7, 2015

(65) Prior Publication Data

US 2016/0238915 A1 Aug. 18, 2016

(30) Foreign Application Priority Data

Feb. 16, 2015 (KR) ........................ 10-2015-0023585

(51) Int. Cl.
*G02F 1/1362* (2006.01)
*G02F 1/1343* (2006.01)
*G09G 3/36* (2006.01)
*G09G 5/42* (2006.01)
*G02F 1/1335* (2006.01)

(52) U.S. Cl.
CPC ..... *G02F 1/133621* (2013.01); *G09G 3/3648* (2013.01); *G02F 2001/134345* (2013.01); *G09G 2300/0876* (2013.01)

(58) Field of Classification Search
CPC combination set(s) only.
See application file for complete search history.

(56) References Cited

U.S. PATENT DOCUMENTS

| | | | |
|---|---|---|---|
| 8,274,620 B2 | 9/2012 | Chiu et al. | |
| 8,896,776 B2 | 11/2014 | Kimura | |
| 2006/0023135 A1* | 2/2006 | Park | G02F 1/136204 349/40 |
| 2006/0164352 A1* | 7/2006 | Yoo | G02F 1/13624 345/87 |
| 2008/0036931 A1* | 2/2008 | Chan | G02F 1/133707 349/38 |

FOREIGN PATENT DOCUMENTS

| | | |
|---|---|---|
| JP | 5107437 B2 | 10/2012 |
| JP | 5368125 B2 | 9/2013 |
| KR | 10-2011-0117998 A | 10/2011 |
| KR | 10-1255283 B1 | 4/2013 |
| KR | 10-2014-0097905 A | 8/2014 |

* cited by examiner

*Primary Examiner* — Lauren Nguyen
(74) *Attorney, Agent, or Firm* — Innovation Counsel LLP

(57) ABSTRACT

A display device includes a plurality of pixels, and each of the plurality of pixels includes: a first sub-pixel including a transistor connected to a gate line and a data line that intersect with each other and are insulated from each other and a first liquid crystal capacitor connected to the transistor. A second sub-pixel includes a first capacitor that is connected to the first liquid crystal capacitor and a second liquid crystal capacitor that is connected to the first capacitor; a resistor that is connected to the first capacitor; and a second capacitor that is connected to the resistor.

19 Claims, 5 Drawing Sheets

LIQUID CRYSTAL DISPLAY DEVICE PROVIDED WITH A REFLECTIVE-TYPE MONOCHROMATIC DISPLAY SCREEN IN ADDITION TO A COLOR DISPLAY SCREEN

CROSS-REFERENCE TO RELATED APPLICATION

This U.S. non-provisional patent application claims priority under 35 U.S.C. § 119 of Korean Patent Application No. 10-2015-0023585, filed on Feb. 16, 2015, the disclosure of which is hereby incorporated by reference in its entirety.

BACKGROUND

The present disclosure herein relates to a display device, and more particularly, to a display device having improved light transmittance by increasing an aperture ratio.

Recently, various display devices such as a liquid crystal display device, an electrowetting display device, an electrophoretic display device, and an organic light emitting display device have been developed. In general, a display device includes a plurality of pixels for displaying an image. The pixels receive data signals in response to gate signals and display the image corresponding to the data signals.

A liquid crystal display device has low viewing angle performance compared to other display devices. The viewing angle performance of a liquid crystal display can be improved by enhancing a side visibility to a level of a front visibility. To improve the viewing angle performance, drive systems employing various modes such as a patterned vertical alignment (PVA) mode, a multi-domain vertical alignment (MVA) mode, and a super-patterned vertical alignment (S-PVA) mode have been developed.

For example, the S-PVA mode includes two sub-pixels for each of pixels of a display device. Different data voltages different are applied to the two sub-pixels. The two sub-pixels have different brightness values because they are charged with different pixel voltages.

Human eyes looking at the display device recognize the median value of the two brightness values. The side viewing angle may be prevented from being degraded due to distortion of a gamma curve at an intermediate gray level or less. Since the two sub-pixels are charged with different pixel voltages, the side visibility of the display device may be improved.

SUMMARY

The present disclosure provides a display device having improved light transmittance by increasing an aperture ratio. According to one embodiment of the present disclosure, a display device includes a plurality of pixels. Each of the plurality of pixels includes: a first sub-pixel including a transistor that is connected to a gate line and a data line that intersect with each and are insulated from each other, and a first liquid crystal capacitor that is connected to the transistor; and a second sub-pixel including a first capacitor that is connected to the first liquid crystal capacitor, a second liquid crystal capacitor that is connected to the first capacitor, a resistor that is connected to the first capacitor, and a second capacitor that is connected to the resistor.

In other embodiments of the present disclosure, the transistor may include a gate electrode connected to the gate line, a source electrode connected to the data line, and a drain electrode connected to the first liquid crystal capacitor.

In still other embodiments of the present disclosure, the first liquid crystal capacitor may include: a first pixel electrode connected to the drain electrode; a common electrode disposed to face the first pixel electrode; and a liquid crystal layer disposed between the first pixel electrode and the common electrode.

In even other embodiments of the present disclosure, the first capacitor may include: a first electrode connected to the first pixel electrode; and a second electrode disposed to be insulated from and to overlap the first electrode.

In yet other embodiments of the present disclosure, the first electrode may be disposed on a same layer as the gate electrode, and the second electrode may be disposed on a same layer as the source electrode and the drain electrode.

In further embodiments of the present disclosure, the second liquid crystal capacitor may include: a second pixel electrode connected to the second electrode; the common electrode disposed to face the second pixel electrode; and the liquid crystal layer disposed between the second pixel electrode and the common electrode.

In still further embodiments of the present disclosure, each of the plurality of pixels may further include a planar region. The planar region may include: a first pixel region on which the first pixel electrode is disposed; a second pixel region on which the second pixel electrode is disposed; and a non-pixel region formed around the first pixel region and the second pixel region. The transistor, the first capacitor, the second capacitor, and the resistor are disposed on the non-pixel region between the first pixel region and the second pixel region.

In even further embodiments of the present disclosure, the second capacitor may include a third electrode and a fourth electrode disposed to be insulated from and to overlap each other, the third electrode may be disposed on a same layer as the gate electrode, and the fourth electrode may be disposed on a same layer as the source electrode and the drain electrode.

In yet further embodiments of the present disclosure, the display devices may further include a storage line that is disposed on a same layer as the gate line and extends parallel to the gate line, and the third electrode may be branched from the storage line.

In much further embodiments of the present disclosure, the display device may further include: a first base substrate on which the gate electrode, the first electrode and the third electrode are disposed; a first insulating layer that is disposed on the first base substrate and covers the gate electrode, the first electrode, and the third electrode; a first semiconductor layer that is disposed on the first insulating layer and covers the gate electrode; a second semiconductor layer that is disposed on the first insulating layer between the first and third electrodes, and on the first insulating layer and covers the first electrode and the third electrode; a second insulating layer that is disposed on the first insulating layer and covers the transistor, the first capacitor, the second capacitor, and the second semiconductor layer; and a color filter that extends in a row direction and overlaps pixels arranged in the row direction. The second semiconductor layer that is disposed on the first insulating layer between the first capacitor and the second capacitor may form the resistor.

In still much further embodiments of the present disclosure, the source electrode and the drain electrode may be disposed to be spaced apart from each other on the first semiconductor layer, the second electrode and the fourth electrode may be disposed on the second semiconductor layer, and the first electrode and the second pixel electrode may be disposed on the color filter.

In even much further embodiments of the present disclosure, the display device may further include: a first contact hole that penetrates the color filter and the second insulating layer and exposes a predetermined area of the drain electrode; and a second contact hole that penetrates the color filter and the first and second insulating layers and exposes a predetermined area of the first electrode.

In yet much further embodiments of the present disclosure, the drain electrode may extend to be electrically connected to a connection electrode that is branched from the first pixel electrode through the first contact hole, and the first electrode may extend to be electrically connected to a connection electrode that is branched from the first pixel electrode through the second contact hole.

In some embodiments of the present disclosure, the display device may further include a third contact hole that penetrates the color filter and the second insulating layer and exposes a predetermined area of the second electrode and the second electrodes may extend to a central portion of the second pixel electrode to be electrically connected to the central portion of the second pixel electrode through the third contact hole.

In other embodiments of the present disclosure, the first capacitor may have a larger area than the second capacitor.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain principles of the present disclosure. In the drawings.

DETAILED DESCRIPTION OF THE EMBODIMENTS

Figure 1:
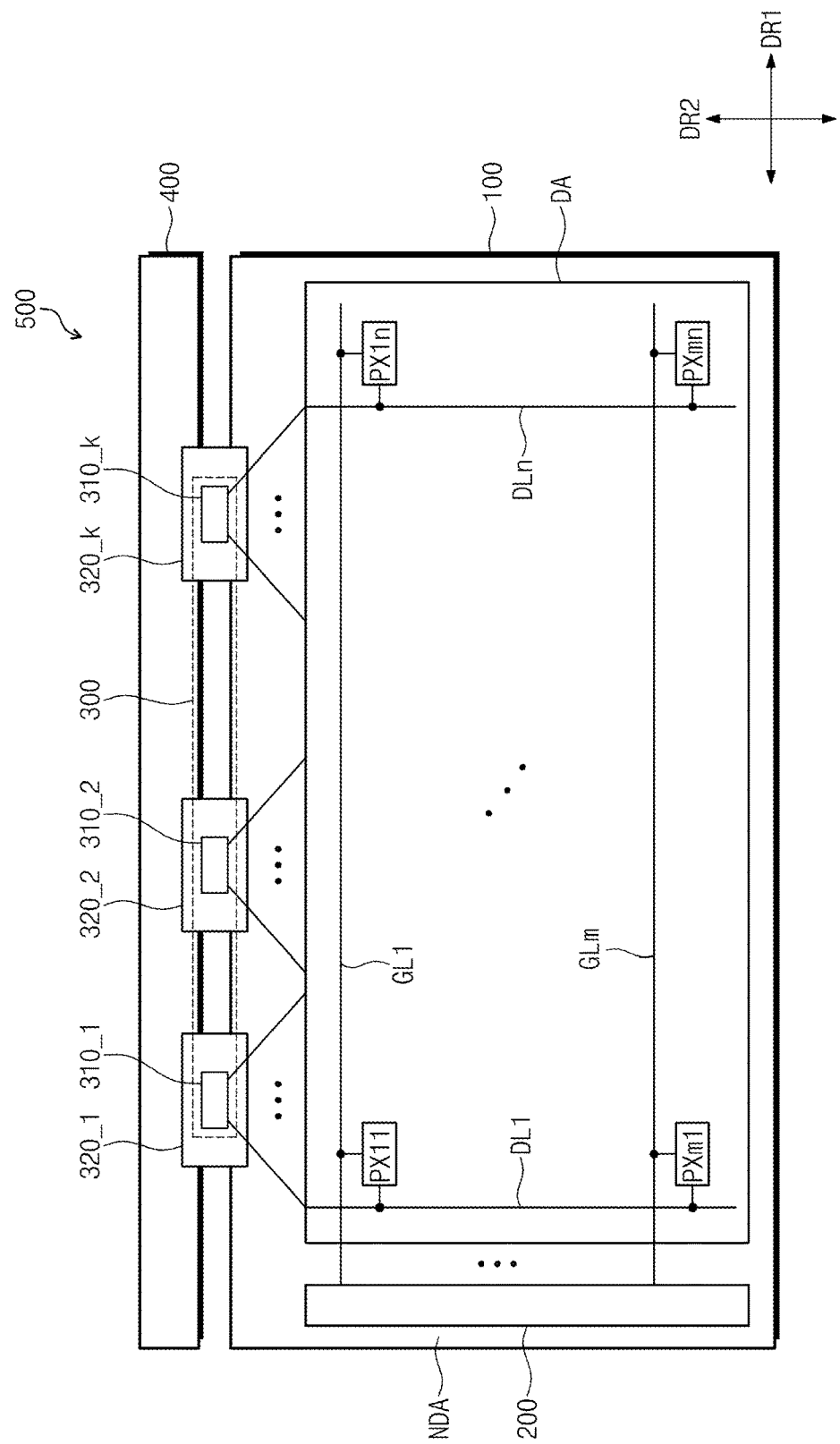
FIG. 1 illustrates a plan view of a display device, according to an embodiment of the present disclosure.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that the present disclosure is thorough and complete, and fully conveys the scope to those skilled in the art. Like reference numerals refer to like elements throughout.

It will also be understood that when an element, or a layer is referred to as being 'on' another element, or layer, it can be directly on the other element, or layer, or intervening an element, or a layer may also be present. On the contrary, when an element is referred to as being 'directly on' or 'directly 'above', it means that intervening an element, or a layer may not be present. As used herein, the term 'and/or' includes any and all combinations of one or more of the associated listed items.

Spatially relative terms, such as 'below,' 'beneath,' 'lower,' 'above,' 'upper,' and the like, may be used herein to describe one element or feature's relationship to another element(s) or feature(s) as illustrated in the figures. It will be understood that the spatially relative terms are intended to encompass different orientations of the device in use or operation in addition to the orientation illustrated in the figures. Although the terms, such as first and second, may be used herein to describe various elements, components, and/or sections, the elements, components, and/or sections should not be limited by these terms. These terms are used only to differentiate one element, component, and/or section from another one. Thus, a first element, component, and/or section discussed below could be termed a second element, component, or section without departing from the spirit and scope of the present disclosure.

Exemplary embodiments of the present disclosure are described herein with reference to plan illustrations and cross-sectional illustrations that are schematic illustrations of idealized exemplary embodiments of the present disclosure. As such, variations from the shapes of the illustrations as a result, for example, of manufacturing techniques and/or tolerances, are to be expected. Thus, exemplary embodiments of the present disclosure should not be construed as being limited to the particular shapes of regions illustrated herein, but instead are understood to include deviations in shapes that result, for example, from manufacturing. Thus, the regions illustrated in the figures are schematic in nature and their shapes, dimensions, and scales are not intended to illustrate the actual shape of a region of a device and limit the scope of the present disclosure. Hereinafter, exemplary embodiments of the present disclosure will be described in detail with reference to the accompanying drawings.

FIG. 1 is a plan view of a display device, according to an embodiment of the present disclosure. A display device 500 includes a display panel 100, a gate driver 200, a data driver 300, and a printed circuit board 400. The display panel 100 may be a liquid crystal display panel including a liquid crystal layer disposed between a first substrate and a second substrate facing each other.

The display panel 100 includes a plurality of gate lines GL1-GLm, a plurality of data lines DL1-DLn, and a plurality of pixels PX11-PXmn where m and n are integers greater than zero. The gate lines GL1-GLm and the data lines DL1-DLn are disposed to intersect with each other while being insulated from each other.

The gate lines GL1-GLm are extended in a first direction DR1 and are connected to the gate driver 200. The data lines DL1-DLn are extended in a second direction D2 intersecting with the first direction DR1 and are connected to the data driver 300. The first direction DR1 may be a row direction and the second direction DR2 may be a column direction. A planar area of the display panel 100 includes a display area DA displaying an image and a non-display area NDA that surrounds the display area DA.

The pixels PX11-PXmn are arranged in a matrix configuration on the display area DA. For example, the pixels PX11-PXmn are disposed in regions partitioned by the gate lines GL1-GLm and data lines DL1-DLn intersecting with each other. The pixels PX11-PXmn may be arranged in m rows and n columns.

The pixels PX11-PXmn are respectively connected to a corresponding gate line among the gate lines GL1-GLm, and to a corresponding data line among the data lines DL1-DLn.

Each of the pixels PX11-PXmn may display one of primary colors. The primary colors may include red, green, blue, and white colors. In another embodiment, the primary colors may include a variety of colors such as yellow, cyan, and magenta colors.

The gate driver 200 is disposed on the non-display area NDA adjacent to one side of the display area DA in the first direction DR1. The gate driver 200 is formed by a same process as transistors of the pixels PX11-PXmn are mounted on the display panel 100. The gate driver 200 may include an amorphous silicon TFT gate driver circuit (ASG) or an oxide silicon TFT gate driver circuit (OSG).

In another embodiment, the gate driver 200 may include a plurality of driver chips mounted on a flexible printed circuit board that is connected to the display panel 100 in a tape carrier package (TCP) type. Further, the gate driver 200 including a plurality of driver chips may be mounted on the display panel 100 in a chip on glass (COG) type.

The gate driver 200 receives a gate control signal from a timing controller (not shown) mounted on the printed circuit board 400. Although not shown, the timing controller may be mounted on the printed circuit board 400 in the form of an integrated circuit chip that is connected to the gate driver 200 and data driver 300.

The gate driver 200 generates a plurality of gate signals in response to a gate control signal. The gate signals may be output in a sequence. The gate signals are provided to the pixels PX11-PXmn row by row through the gate lines GL1-GLm. As a result, the pixels PX11-PXmn may be driven row by row.

The data driver 300 includes a plurality of source driver chips 310_1-310_k. The source driver chips 310_1-310_k are mounted on flexible circuit boards 320_1-320_k and connected to the printed circuit board 400 and the non-display area NDA adjacent to a top side of the display area DA. The data driver 300 may be connected to the display panel 100 in a tape carrier package (TCP) type. In another embodiment, the data driver 300 including a plurality of driver chips may be mounted on the display panel 100 in a chip-on-glass (COG) type.

The data driver 300 receives image data and a data control signal from the timing controller. The data driver 300 generates analog data voltages corresponding to the image signal in response to the data control signal. The data voltages are provided to the pixels PX11-PXmn through the data lines DL1-DLn. The pixels PX11-PXmn receive the data voltages through the data lines DL1-DLn in response to the gate signals that are provided through the gate lines GL1-GLm. The pixels PX11-PXmn displays a gradation corresponding to the data voltage. As a result, an image may be displayed.

Figure 2:
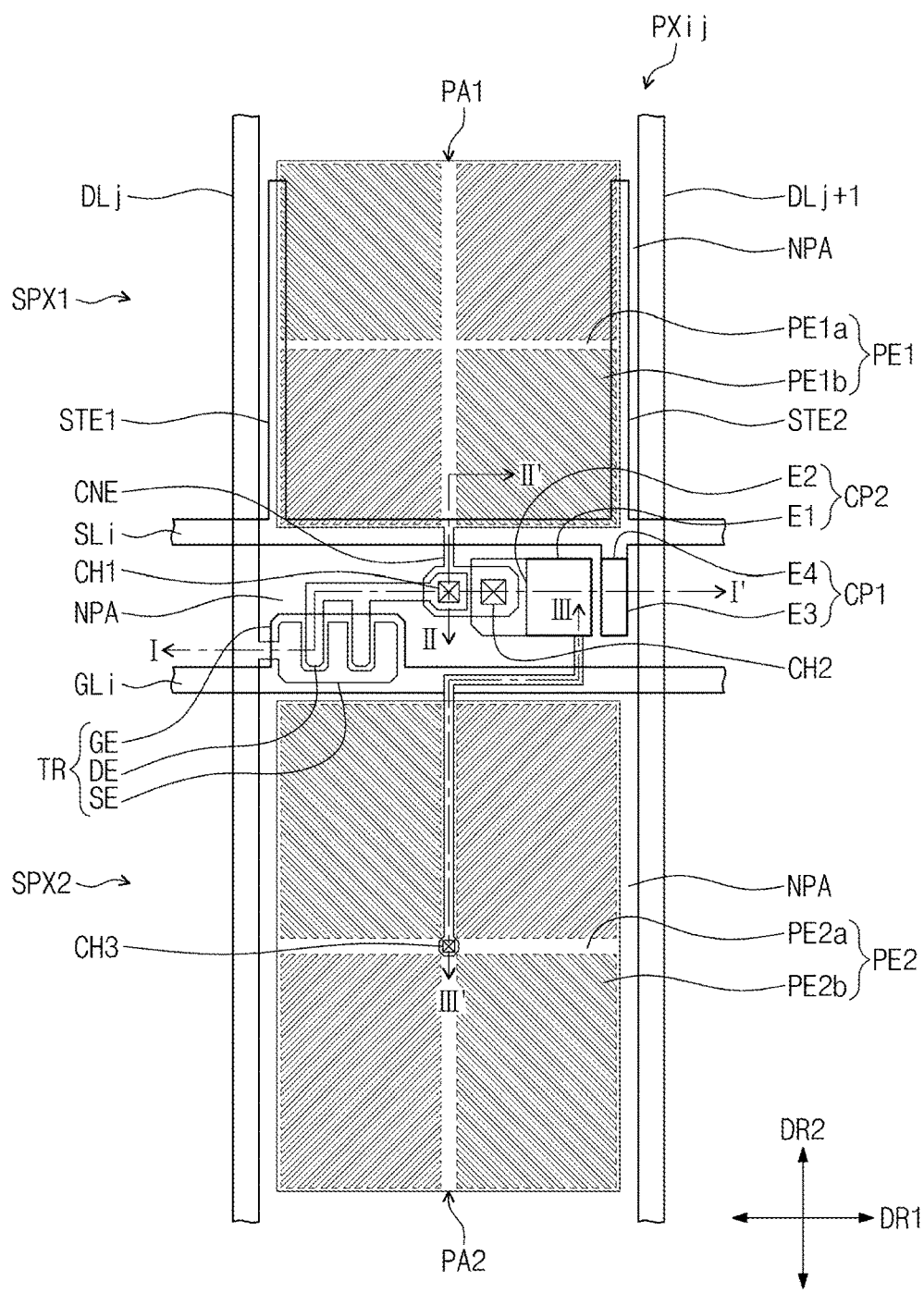
FIG. 2 illustrates a layout of a pixel illustrated in FIG. 1.

FIG. 2 illustrates a layout of a pixel illustrated in FIG. 1. Although FIG. 2 illustrates only one pixel, other pixels illustrated in FIG. 1 will have a same configuration. Hereinafter, a configuration of one pixel PXij will be described for convenience of explanation.

Referring to FIG. 2, the pixel PXij is connected to a gate line GLi and a data line DLj. The gate line GLi extends in a first direction DR1. The data line DLj extends in a second direction D2 intersecting with the first direction DR1.

The pixel PXij includes a first sub-pixel SPX1 and a second sub-pixel SPX2. The first sub-pixel SPX1 includes a transistor TR and a first pixel electrode PE1 connected to the transistor TR. The second sub-pixel SPX2 includes a first capacitor CP1 connected to the first pixel electrode PE1, a second pixel electrode PE2 connected to the first capacitor CP1, and a second capacitor CP2 disposed adjacent to the first capacitor CP1.

A region displaying an image in the first sub-pixel SPX1 may be referred to as a first pixel region PA1. A region displaying an image in the second sub-pixel SPX2 may be referred to as a second pixel region PA2. The first pixel electrode PE1 is disposed on the first pixel region PA1. The second pixel electrode PE2 is disposed on the second pixel region PA2.

Peripheral regions of the first and second pixel regions PA1 and PA2 of the pixel PXij may be referred to as a non-pixel region NPA. The gate line GLi and the data lines DLj and DLj+1 are disposed on the non-pixel region NPA.

The transistor TR and the first and second capacitors CP1 and CP2 are disposed on the non-pixel region NPA between the first and second pixel regions PA1 and PA2 of the pixel PXij. The transistor TR of the first sub-pixel SPX1 includes a gate electrode GE branched from the gate line GLi, a source electrode SE branched from the data line DLj, and a drain electrode DE connected to the first pixel electrode PE1. The drain electrode DE extends to be electrically connected to a connection electrode CNE branched from the first pixel electrode PE1 through a first contact hole CH1.

A storage line SLi extends in the first direction DR1. The storage line SLi partially overlaps a bottom side of the first pixel electrode PE1. First and second storage electrodes STE1 and STE2 branched from the storage line SLi in the second direction DR2 partially overlap a left side and a right side of the first pixel electrode PE1 in the first direction DR1.

The storage line SLi and the first and second storage electrodes STE1 and STE2 are disposed on a same layer as the gate line GLi. The storage line SLi may be applied with a storage voltage.

The first capacitor CP1 of the second sub-pixel SPX2 includes first and second electrodes E1 and E2 disposed to overlap each other. The first and second electrodes E1 and E2 are insulated from and face with each other. The first electrode E1 may be disposed on a same layer as the gate electrode GE. The second electrode E2 may be disposed on a same layer as the source and drain electrodes SE and DE.

The first electrode E1 extends to be electrically connected to a connection electrode CNE through a second contact hole CH2. The second electrode E2 extends to be connected to the second pixel electrode PE2 through a third contact hole CH3. In an exemplary embodiment, the second electrode E2 may extend to a central portion of the second pixel electrode PE2 to be connected to the central portion of the second pixel electrode PE2 through the third contact hole CH3.

The second capacitor CP2 of the second sub-pixel SPX2 includes a third electrode E3 and a fourth electrode E4 disposed to overlap each other. The third and fourth electrodes E3 and E4 are insulated from and face each other. The third electrode E3 is branched from the storage line SLi. The fourth electrode E4 is disposed on a same layer as the source and drain electrodes SE, DE.

On a planar level, an area of the first capacitor CP1 may be greater than that of the second capacitor CP2. Accordingly, a capacity of the first capacitor CP1 may be greater than that of the second capacitor CP2.

The first pixel electrode PE1 includes a first stem unit PE1a and a plurality of first branch units PE1b protruding from the first stem unit PE1a and extending in a radial form. The first stem unit PE1a may be provided in various shapes. In an exemplary embodiment, the first stem unit PE1a may have a cross shape as illustrated in FIG. 2. In this case, the first pixel region PA1 of the pixel PXij may be divided into four domains by the first stem unit PE1a.

The first branch units PE1b correspond to the respective domains of the four domains to extend in different directions from each other. The first branch units PE1b may extend parallel to each other within the respective domains that are partitioned by the first stem unit PE1a and disposed spaced apart from each other. The first branch units PE1b adjacent to each other are spaced apart from each other at a distance of a micrometer unit to form a plurality of fine slits.

Liquid crystal molecules of the liquid crystal layer in the first pixel region PA1 is pre-tilted in different directions for each of the four domains by the fine slits. Thus, four domains having the liquid crystal molecules oriented in different directions are formed in the liquid crystal layer. The more the liquid crystal molecules tilt, the wider the reference viewing angle of a display device is achieved.

The first pixel electrode PE1 may be made of a transparent conductive material. For example, the first pixel electrodes PE1 may be made of a transparent conductive material such as indium tin oxide (ITO), indium zinc oxide (IZO), or indium tin zinc oxide (ITZO).

The second pixel electrode PE2 includes a second stem unit PE2a and a plurality of second branch units PE2b protruding from the second stem unit PE2a and extending in a radial shape. A planar area of the second pixel electrode PE2 is larger than that of the first pixel region PE1.

Except for a difference in an area thereof, a shape of the second pixel electrode PE2 is substantially the same as that of the first pixel region PE1. In addition, the second pixel electrode PE2 may be made of a same material as the first pixel region PE1. Therefore, the description about a configuration of the second pixel electrode PE2 will not be repeated.

Although not illustrated in FIG. 2, a plurality of color filters extending in the second direction DR2 may be disposed to overlap pixels arranged in the second direction DR2. The color filters provide a color to light passing through the corresponding pixels.

Although not illustrated in FIG. 2, a black matrix may be disposed on the non-pixel region NPA. The black matrix blocks unnecessary light in the non-pixel region NPA. In addition, the black matrix blocks light that may leak by an abnormal movement of liquid crystal molecules in edges of the first and second pixel regions PA1 and PA2.

Figure 3:
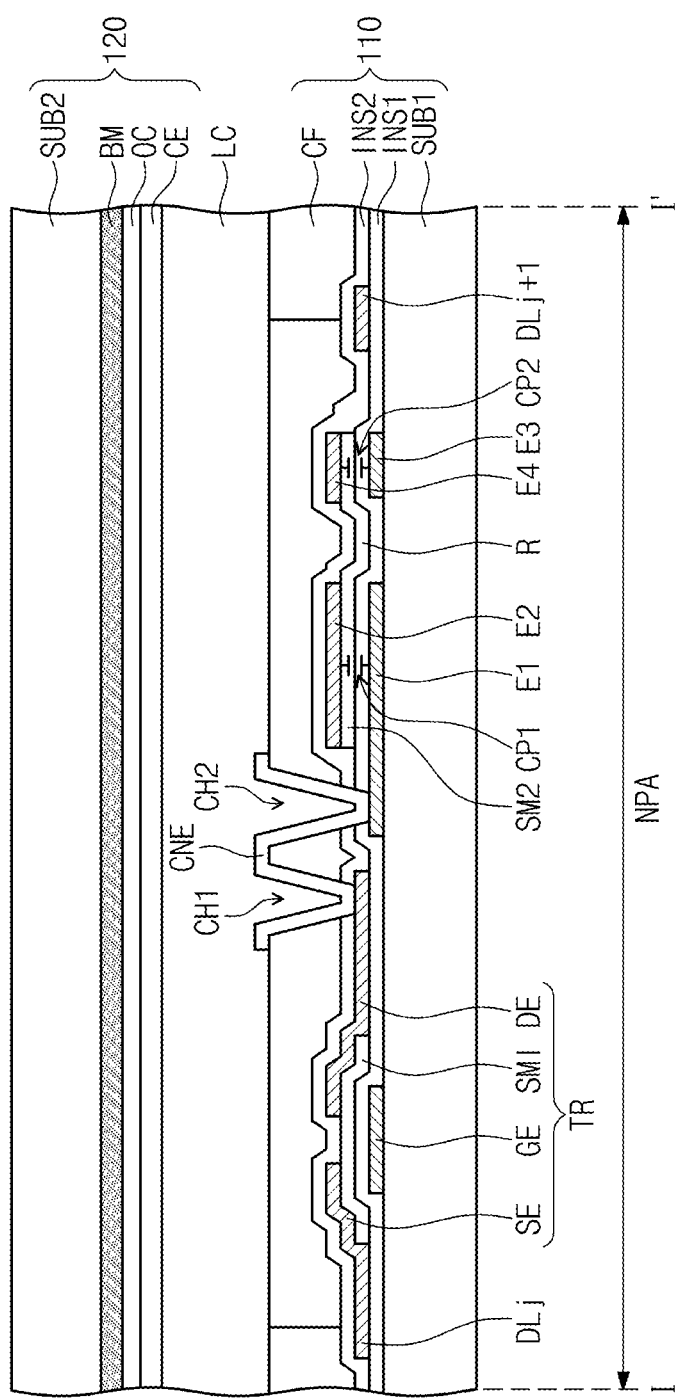
FIG. 3 illustrates a sectional view taken along line I-I' illustrated in FIG. 2.
Figure 4:
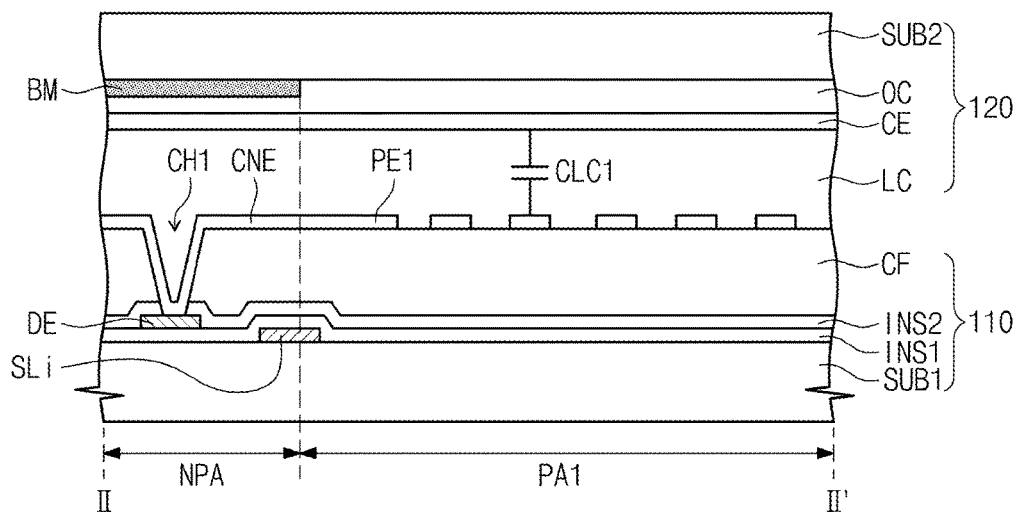
FIG. 4 illustrates a sectional view taken along line II-II' illustrated in FIG. 2.
Figure 5:
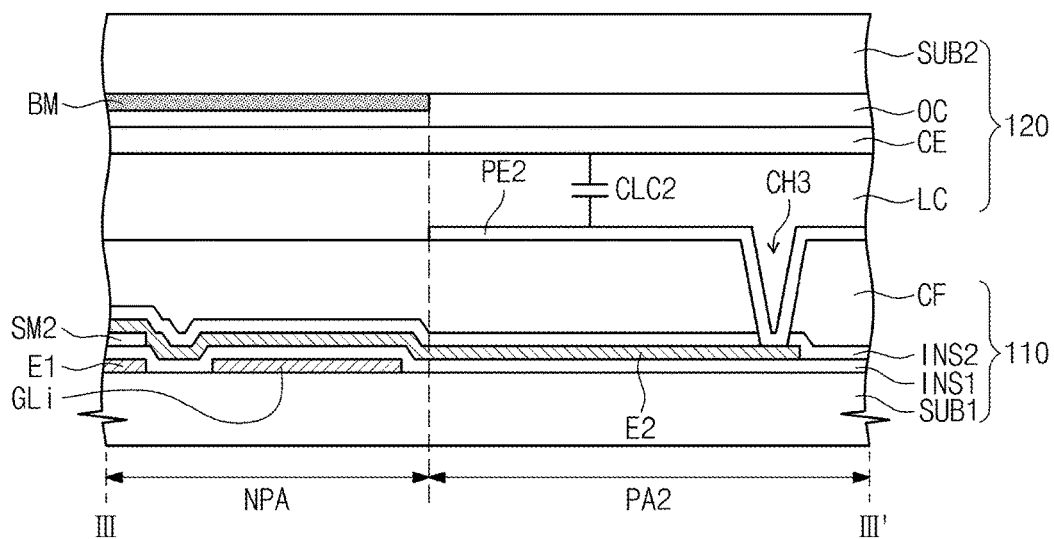
FIG. 5 illustrates a sectional view taken along line III-III' illustrated in FIG. 2.

FIG. 3 illustrates a sectional view taken along line I-I' illustrated in FIG. 2. FIG. 4 illustrates a sectional view taken along line -' illustrated in FIG. 2. FIG. 5 illustrates a sectional view taken along line -' illustrated in FIG. 2.

Referring to FIGS. 3, 4, and 5, the pixel PXij includes a first substrate 110, a second substrate 120 facing the first substrate 110, and a liquid crystal layer LC that is disposed between the first substrate 110 and the second substrate 120.

The first substrate 110 includes a first base substrate SUB1 and a transistor TR disposed on the first base substrate SUB1, the first and second capacitors CP1 and CP2, the color filter CF, and the first and second pixels electrodes PE1 and PE2.

The first base substrate SUB1 may be a transparent or an opaque substrate. For example, the first base substrate SUB1 may be a silicon substrate, glass substrate, or plastic substrate. The gate line GLi, the storage line SLi, and the gate electrode GE of the transistor TR, the first electrode E1 of the first capacitor CP1, and the third electrode E3 of the second capacitor CP2 are disposed on the first base substrate SUB1.

A first insulating layer INS1 is disposed on the first base substrate SUB1 and covers the gate line GLi, the storage line SLi, the gate electrode GE, the first electrode E1, and the third electrode E3. The first insulating layer INS1 may be referred to as a gate insulating film. The first insulating layer INS1 may be an inorganic insulating film including an inorganic material.

A first semiconductor layer SM1 of the transistor TR is disposed on the first insulating layer INS1 that covers the gate electrode GE. Although not shown, the first semiconductor layer SM1 may include an active layer and an ohmic contact layer.

The source electrode SE and the drain electrode DE of the transistor TR are disposed spaced apart from each other on the first semiconductor layer SM1 and the first insulating layer INS1. The first semiconductor layer SM1 forms a conductive channel between the source electrode SE and the drain electrode DE.

A second semiconductor layer SM2 is disposed on the first insulating layer INS1 between the first and third electrodes E1 and E3. The second semiconductor layer SM2 extends and is disposed on the first insulating layer INS1 that covers the first and third electrodes E1 and E3. The second semiconductor layer SM2 has a same configuration as the first semiconductor layer SM1.

The second electrode E2 is disposed on the second semiconductor layer SM2 to overlap the first electrode E1. The fourth electrode E4 is disposed on the second semiconductor layer SM2 and overlaps the third electrode E3.

As illustrated in FIG. 3, the first electrode E1 extends to an area on which the second contact hole CH2 is disposed. As illustrated in FIG. 5, the second electrode E2 extends to the third contact hole CH3 that is disposed on a central portion of the second pixel electrode PE2.

The first capacitor CP1 is formed by the first and second electrodes E1 and E2 that overlap each other, the first insulating layer INS1 that is disposed between the first and second electrodes E1 and E2, and the second semiconductor layer SM2.

The second capacitor CP2 is formed by the third and fourth electrodes E3 and E4 that overlap each other, the first insulating layer INS1 that is disposed between the third and fourth electrodes E3 and E4, and the second semiconductor layer SM2.

The second semiconductor layer SM2 between the first and second capacitors CP1 and CP2 forms a resistance. Hereinafter, the second semiconductor layer SM2 between the first and second capacitors CP1 and CP2 is referred to as the resistor R.

The data lines DLj and DLj+1 are disposed on the first insulating layer INS1. The second insulating layer INS2 is disposed on the first insulating layer INS1 and covers the transistor TR, the first and second capacitors CP1 and CP2, the resistor R, and the data lines DLj and DLj+1. The second insulating layer INS2 may be referred to as a passivation film. The second insulating layer INS2 may be an inorganic insulating film including an inorganic material.

The color filters are disposed on the second insulating layer INS2. As described above, the color filters CF extend in the second direction D2 and overlap the pixels arranged in the second direction D2. As illustrated in FIG. 3, boundary lines of the color filters CF may be disposed to be in contact with each other in the non-pixel region NPA on which the data lines DLj and DLj+1 are disposed.

The first contact hole CH1 penetrating the color filter CF and the second insulating layer INS2 and exposing a predetermined area of the drain electrode DE is formed. The second contact hole CH2 penetrating the color filter CF and the first and second insulating layers INS1 and INS2 and exposing a predetermined area of the first electrode E1 is formed. The region of the first electrode E1 exposed by the second contact hole CH2 is a region that does not overlap the second electrode E2. The third contact hole CH3 penetrates the color filter CF and the second insulating layer INS2, extends to a central portion of the second pixel electrode PE2, and exposes a predetermined area of the second electrode E2 is formed.

The first pixel electrode PE1 is disposed on the color filter CF in the first pixel region PA1. The second pixel electrode PE2 is disposed on the color filter CF in the second pixel region PA2.

The connection electrode CNE that is branched from the first pixel electrode PE1 into the non-pixel region NPA is electrically connected to the drain electrode DE of the transistor TR through the first contact hole CH1. The connection electrode CNE is connected to the first electrode E1 of the first capacitor CP1 through the second contact hole CH2. The second electrode E2 extends to be electrically connected to the central portion of the second pixel electrode PE2 through the third contact hole CH3.

The second substrate 120 includes the second base substrate SUB2 and the black matrix BM, an overcoat layer OC, and a common electrode CE that are disposed under the second base substrate SUB2. The second base substrate SUB2 may be made of a same material as the first base substrate SUB1.

The black matrix BM is disposed under the second base substrate SUB2 in the non-pixel region NPA. The overcoat layer OC is disposed under the second base substrate SUB2 and covers the black matrix BM. The overcoat layer OC may be an insulating film.

The common electrode CE is disposed under the overcoat layer OC. The common electrode CE is applied with a common voltage. In one embodiment, the common voltage and the storage voltage may be a same voltage level. In another embodiment, the storage voltage may have a different voltage level from the common voltage.

The first liquid crystal capacitor CLC1 is formed by the first pixel electrode PE1 and the common electrode CE facing each other, and a liquid crystal layer LC that is disposed between the first pixel electrode PE1 and the common electrode CE. The second liquid crystal capacitor CLC2 is formed by the second pixel electrode PE2 and the common electrode CE facing each other, and the liquid crystal layer LC that is disposed between the second pixel electrode PE2 and the common electrode CE.

Figure 6:
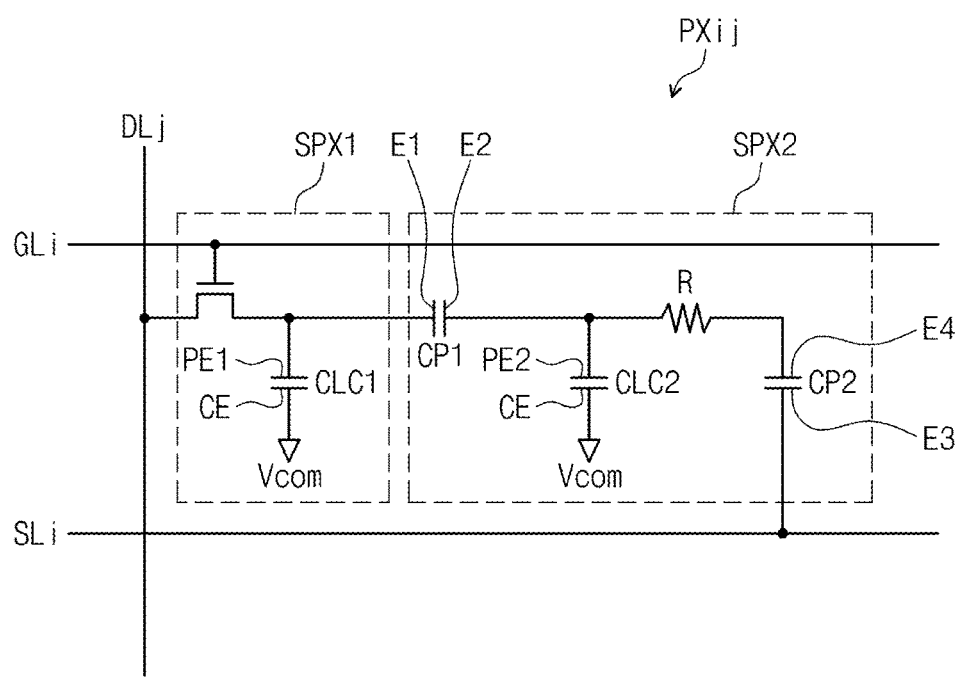
FIG. 6 illustrates an equivalent circuit diagram of the pixel illustrated in FIG. 1.

FIG. 6 illustrates an equivalent circuit diagram of the pixel illustrated in FIG. 1. The pixel PXij is connected to the gate line GLi and the data line DLj. The pixel PXij includes the first and second sub-pixels SPX1 and SPX2.

The first sub-pixel SPX1 includes a transistor TR that is connected to the gate line GLi and the data line DLj, and the first liquid crystal capacitor CLC1 that is connected to the transistor TR. The gate electrode GE of the transistor TR is connected to the gate line GLi. The source electrode SE of the transistor TR is connected to the data line DLj. The drain electrode DE of the transistor TR is connected to the first pixel electrode PE1 of the first liquid crystal capacitor CLC1.

The second sub-pixel SPX2 includes the first capacitor CP1 that is connected to the first liquid crystal electrode CLC1, the second liquid crystal capacitor CLC2 that is connected to the first capacitor CP1, the resistor R that is connected to the first capacitor CP1, and the second capacitor CP2 that is connected to the resistor R. The first electrode E1 of the first capacitor CP1 is connected to the first pixel electrode PE1 of the first liquid crystal capacitor CLC1. The second electrode E2 of the first capacitor CP1 is connected to the second pixel electrode PE2 of the second liquid crystal capacitor CLC2. The first capacitor CP1 is connected to one end of the resistor R, and the second capacitor CP2 is connected to another end of the resistor R. The third electrode E3 of the second capacitor CP2 is connected to the storage line SLi.

As described above, the common electrode CE is applied with the common voltage, and the storage line GLi is applied with a storage voltage. Accordingly, the storage voltage is applied to the third electrode E3 of the second capacitor CP2.

A gate signal is applied to the gate electrode GE of the transistor TR through the gate line GLi. The transistor TR is turned on by the gate signal. The turned-on transistor TR receives a data voltage through the data line DLj and applies the received voltage to the first pixel electrode PE1 of the first liquid crystal capacitor CLC1. The first liquid crystal capacitor CLC1 is charged with the first pixel voltage corresponding to a level difference between the data voltage and the common voltage.

Since the connection electrode CNE that is branched from the first pixel electrode PE1 is connected to the drain electrode DE of the transistor TR and the first electrode E1 of the first capacitor CP1, the data voltage is applied to the first electrode E1 of the first capacitor CP1. Since the second electrode E2 of the first capacitor CP1 is connected to the second pixel electrode PE2 of the second liquid crystal capacitor CLC2, the first capacitor CP1 and the second liquid crystal capacitor CLC2 substantially have a serial connection configuration. In this case, the first pixel voltage corresponding to the level difference between the data voltage and the common voltage is distributed to charge the first capacitor CP1 and the second liquid crystal capacitor CLC2. In other words, the charge is distributed to the first capacitor CP1 and the second liquid crystal capacitor CLC2. Accordingly, the second liquid crystal capacitor CLC2 is charged with a second pixel voltage that is lower than the first pixel voltage.

In a turn-on state of the transistor TR, the resistor R formed of the second semiconductor layer SM2 has a high resistance value, therefore current may not flow to the second capacitor CP2. When the transistor TR is turned off, the second liquid crystal capacitor CLC2 and the second capacitor CP2 share a charge through the resistor R. Accordingly, the second pixel voltage that is charged in the second liquid crystal capacitor CLC2 may become even smaller.

The first sub-pixel SPX1 is charged with the first pixel voltage, and the second sub-pixel SPX2 is charged with the second pixel voltage that is smaller than the first pixel voltage. When different levels of pixel voltages are charged in the first and second sub-pixel SPX1, SPX2, the human eye looking at a display device recognizes the medium value of the two pixel voltages. Accordingly, a side viewing angle of the display device may be prevented from being degraded due to distortion of a gamma curve at an intermediate gray level or less. Since the first and second sub-pixels SPX1 and SPX2 are charged with different pixel voltages, visibility of the display device may be improved.

In contrast to the present embodiments illustrated with reference to FIGS. 1-6, a resistor distribution structure will be explained below. In the resistor distribution structure, the first sub-pixel may include a first transistor that receives data voltage and a first liquid crystal capacitor that is connected to the first transistor. The second sub-pixel may include a second transistor that receives data voltage, a second liquid crystal capacitor that is connected to the second transistor, and a third transistor that is connected to the second transistor and receives storage voltage. The first, second, and third transistors may be connected to a same gate line and turned on at the same time. The first and second transistors are connected to a same data line. In the resistor distribution structure, the first transistor provides data voltage to the first liquid crystal capacitor. The first liquid crystal capacitor is charged with the pixel voltage corresponding to the data voltage. The second transistor receives data voltage, and the third transistor receives storage voltage. In this case, the voltage of the connection point of the second transistor and the third transistor has a voltage value corresponding to the intermediate level of the storage voltage and the data voltage. Accordingly, the second liquid crystal capacitor is charged with the pixel voltage that is lower than that of the first liquid crystal capacitor.

In the resistor distribution structure, a pixel may include first, second, and third transistors, a contact hole connecting the first transistor and the first pixel electrode to each other, a contact hole connecting the second transistor and a second pixel electrode to each other, a contact hole connecting the third transistor and a branch electrode that is branched from the storage line to each other. In the resistor distribution structure, the three transistors and the three contact holes are disposed on a non-pixel region between the first and second pixel regions.

As the number of available transistors and contact holes increases, a larger area for disposing the transistors and contact holes is required, resulting in an increase in non-pixel region. In this case, the first and second pixel regions are relatively decreased.

In contrast to the resistor distribution structure, the present disclosure includes one transistor TR and two contact holes CH1 and CH2 that are disposed on the non-pixel region NPA between the first and second pixel regions PA1 and PA2. Since the number of available transistors and contact holes is decreased, the non-pixel region may be reduced compared to the resistor distribution structure. Since the non-pixel region is reduced, the first and second pixel regions PA1 and PA2 may be relatively increased. Accordingly, an aperture ratio of the pixels PX11-PXmn is increased, and the light transmittance may be improved. As a result, a display device according to an embodiment of the present disclosure may increase the aperture ratio to improve the light transmittance by increasing an aperture ratio.

Exemplary embodiments have been disclosed herein. Although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure.

What is claimed is:

1. A display device comprising a plurality of pixels, wherein each of the plurality of pixels comprises:
a first sub-pixel having a first pixel region and including a transistor that is connected to a gate line and a data line that intersect with each other and are insulated from each other, and a first liquid crystal capacitor that is connected to the transistor; and
a second sub-pixel having a second pixel region and including a first capacitor that is connected to the first liquid crystal capacitor, a second liquid crystal capacitor that is connected to the first capacitor, a resistor that is connected to the first capacitor, and a second capacitor that is connected to the resistor wherein the first pixel region of the first sub-pixel and the second pixel region of the second sub-pixel are defined by adjacent data lines and adjacent gate lines,
wherein the first liquid crystal capacitor is disposed in the first pixel region, and the second liquid crystal capacitor is disposed in the second pixel region, and
wherein the first capacitor and the second capacitor are disposed in a non-pixel region between the first pixel region and the second pixel region.

2. The display device of claim 1, wherein the transistor comprises:
a gate electrode connected to the gate line;
a source electrode connected to the data line; and
a drain electrode connected to the first liquid crystal capacitor.

3. The display device of claim 2, wherein the first liquid crystal capacitor comprises:
a first pixel electrode connected to the drain electrode;
a common electrode disposed to face the first pixel electrode; and
a liquid crystal layer disposed between the first pixel electrode and the common electrode.

4. The display device of claim 3, wherein the first capacitor comprises:
a first electrode connected to the first pixel electrode; and
a second electrode disposed to be insulated from and to overlap the first electrode.

5. The display device of claim 4, wherein the first electrode is disposed on a same layer as the gate electrode, and the second electrode is disposed on a same layer as the source electrode and the drain electrode.

6. The display device of claim 4, wherein the second liquid crystal capacitor comprises:
a second pixel electrode connected to the second electrode;
the common electrode disposed to face the second pixel electrode; and
the liquid crystal layer disposed between the second pixel electrode and the common electrode.

7. The display device of claim 6, wherein each of the plurality of pixels further comprises a planar region, and wherein the planar region comprises:
the first pixel region on which the first pixel electrode is disposed;
the second pixel region on which the second pixel electrode is disposed; and
the non-pixel region formed around the first pixel region and the second pixel region,
wherein the transistor and the resistor are disposed on the non-pixel region between the first pixel region and the second pixel region.

8. The display device of claim 7, further comprising a black matrix disposed on the non-pixel region.

9. The display device of claim 6, wherein the second capacitor comprises a third electrode and a fourth electrode that are disposed to be insulated from and to overlap each other.

10. The display device of claim 9, wherein the third electrode is disposed on a same layer as the gate electrode, and the fourth electrode is disposed on a same layer as the source electrode and the drain electrode.

11. The display device of claim 9, further comprising a storage line that is disposed on a same layer as the gate line and extends parallel to the gate line, wherein the third electrode is branched from the storage line.

12. The display device of claim 9, further comprising:
a first base substrate on which the gate electrode, the first electrode, and the third electrode are disposed;
a first insulating layer that is disposed on the first base substrate and covers the gate electrode, the first electrode, and the third electrode;
a first semiconductor layer that is disposed on the first insulating layer and covers the gate electrode;
a second semiconductor layer that is disposed on the first insulating layer between the first and third electrodes and on the first insulating layer and covers the first electrode and the third electrode;
a second insulating layer that is disposed on the first insulating layer and covers the transistor, the first capacitor, the second capacitor, and the second semiconductor layer; and
a color filter that extends in a row direction and overlaps pixels arranged in the row direction,
wherein the second semiconductor layer that is disposed on the first insulating layer between the first capacitor and the second capacitor forms the resistor.

13. The display device of claim 12, wherein the source electrode and the drain electrode are disposed to be spaced apart from each other on the first semiconductor layer, the second electrode and the fourth electrode are disposed on the second semiconductor layer, and the first pixel electrode and the second pixel electrode are disposed on the color filter.

14. The display device of claim 12, further comprising:
a first contact hole that penetrates the color filter and the second insulating layer and exposes a predetermined area of the drain electrode; and
a second contact hole that penetrates the color filter and the first and second insulating layers and exposes a predetermined area of the first electrode.

15. The display device of claim 14, wherein the drain electrode extends to be electrically connected to a connection electrode that is branched from the first pixel electrode through the first contact hole.

16. The display device of claim 14, wherein the first electrode extends to be electrically connected to a connection electrode that is branched from the first pixel electrode through the second contact hole.

17. The display device of claim 12, further comprising a third contact hole that penetrates the color filter and the second insulating layer and exposes a predetermined area of the second electrode.

18. The display device of claim 17, wherein the second electrode extends to a central portion of the second pixel electrode to be electrically connected to the central portion of the second pixel electrode through the third contact hole.

19. The display device of claim 1, wherein a capacitance of the first capacitor is greater than a capacitance of the second capacitor.

* * * * *